United States Patent [19]

Pinnow et al.

[11] Patent Number: 4,834,470
[45] Date of Patent: May 30, 1989

[54] FOOD SERVICE CABINET WITH SELF-CLOSING DOOR

[75] Inventors: Curtis C. Pinnow; Robert C. Fortmann, both of Mundelein, Ill.

[73] Assignee: Carter-Hoffmann Corporation, Mundelein, Ill.

[21] Appl. No.: 93,737

[22] Filed: Sep. 8, 1987

[51] Int. Cl.[4] ............................................. A47B 88/00
[52] U.S. Cl. ..................................... 312/311; 312/320; 312/330 R
[58] Field of Search ..... 312/330 R, 330 SM, 341 NR, 312/333, 236, 311, 320

[56] References Cited

U.S. PATENT DOCUMENTS

| 332,595 | 12/1885 | Dean | 312/330 R X |
|---|---|---|---|
| 2,312,325 | 3/1943 | Earle | 312/330 R X |
| 2,789,025 | 4/1957 | Regenhardt | 312/341 N R |
| 3,227,505 | 1/1966 | Ambaum | 312/330 R X |
| 3,490,823 | 1/1970 | Neu et al. | 312/330 R X |
| 3,542,447 | 11/1970 | Himelreich | 312/330 R |
| 3,954,315 | 5/1976 | Sanden | 312/333 |
| 4,066,308 | 1/1978 | Wedel | 312/333 |
| 4,448,523 | 5/1984 | Kanzaki | 312/341 N R X |
| 4,501,456 | 2/1985 | Schafer | 312/330 R X |
| 4,657,214 | 4/1987 | Foster | 312/311 X |

FOREIGN PATENT DOCUMENTS

| 931462 | 8/1955 | Fed. Rep. of Germany | 312/333 |
|---|---|---|---|
| 3307994 | 9/1984 | Fed. Rep. of Germany | 312/330 R |
| 993507 | 11/1951 | France | 312/330 R |
| 618585 | 3/1961 | Italy | 312/330 R |

Primary Examiner—Peter A. Aschenbrenner
Assistant Examiner—Thomas A. Rendos
Attorney, Agent, or Firm—Wood, Dalton, Phillips, Mason & Rowe

[57] ABSTRACT

The present invention is directed to a food treatment device having a cabinet defining a food treatment space and an opening permitting access to the space, a pivotally mounted door movable between closed and open positions, a tray for supporting food and mounted for movement through the cabinet opening to selectively place food in the treatment space and withdraw food therefrom, and structure for moving the door from its closed position to its open position as an incident of movement of the tray out of the storage space and for moving the door from its open to its closed position as an incident of movement of the tray into the treatment space.

11 Claims, 1 Drawing Sheet

FOOD SERVICE CABINET WITH SELF-CLOSING DOOR

BACKGROUND OF THE INVENTION

1. Field of the Invention

This invention relates to food service cabinets with trays for selectively moving food into and out of a treatment space defined by the cabinet and, more particularly, to structure for selectively opening and closing an access door in response to movement of the tray.

2. Background Art

Food is commonly cooked and/or preserved in cabinets having treatment spaces with controlled temperature and/or humidity. The use of these cabinets have become increasingly popular in fast food operations to, for example, preserve breads, pancakes, waffles, tortillas, and the like. Typically, the foods are stored in bulk in the cabinets and removed by food servers on an order-by-order basis.

In a typical cabinet construction, a removable tray is provided upon which the food is carried. A door is hingedly attached to the cabinet and provides an access to the inside storage space and the tray therein. To load food into the cabinet, a user first opens the door and withdraws the tray to place food thereon. The loaded tray is then placed back into the cabinet and the door closed to maintain the desired conditions within the cabinet.

The problem with such conventional structures is that generally they require two-handed operation as the door and tray must be separately manipulated both to load and unload the cabinet. Such conventional cabinets are thus relatively inefficient and often impractical in high volume fast food operations.

An additional problem is that the user may frequently leave the door open after loading food into or removing food from the cabinet. The result is a loss of heat and/or humidity from the cabinet to the atmosphere and a resulting uncontrolled cooking and/or preservation of food within the cabinet.

SUMMARY OF THE INVENTION

The present invention is specifically directed to overcoming the above enumerated problems in a novel and simple manner.

The present invention is directed to a food treatment device having a cabinet defining a food treatment space and an opening permitting access to the space, a pivotally mounted door movable between closed and open positions, a tray for supporting food and mounted for movement through the cabinet opening to selectively place food in the treatment space and withdraw food therefrom, and structure for moving the door from its closed position to its open position as an incident of moveemnt of the tray out of the storage space and for moving the door from its open to its closed position as an incident of movement of the tray into the treatment space.

Upon the tray being moved into the treatment space, the door automatically closes and thereby covers the access opening. As long as the tray is pushed back into the cabinet, the user cannot inadvertently leave the door open as might appreciably alter the environmental conditions within the cabinet.

Additionally, the user never has to directly manipulate the door, thereby eliminating one step in both loading and unloading of the cabinet and making one-handed operation of the tray and door possible. In a preferred form, a handle is provided on the tray and projects at all times forwardly of the door so as to be readily accessible.

To make the door self-closing, the door is hinged adjacent its top edge for pivoting about a horizontal axis between its closed and open positions. The weight of the door normally urges the door into the closed position. The tray has a cam edge that is above the surface thereon supporting the food. The edge bears directly against and progressively urges the door from its closed position into its open position as the tray is withdrawn from the cabinet. Preferably a cam surface is defined on the upper edges of each of two laterally spaced walls which bound the food storage space.

A cooperating pin and slot arrangement guides movement of the tray into and out of the cabinet. Preferably, each guide slot declines towards the front of the cabinet and the tray is similarly inclined so as to make the contents of the tray readily viewable and easily accessible with the cabinet at, for example, eye level of the user. The cabinet can thus be located out of the way of servers performing their normal duties, as on conventional height counters.

In a preferred form of the invention, a plurality of drawers are provided with an equal number of trays. Only the tray with the desired contents need be withdrawn. Trays of convenient size can thus be used. At the same time, the provision of more than one door reduces door size and thereby minimizes the associated opening size in the cabinet through which the heat and humidity within the cabinet can escape upon the selected, individual doors being opened

DETAILED DESCRIPTION OF THE DRAWINGS

Figure 1:
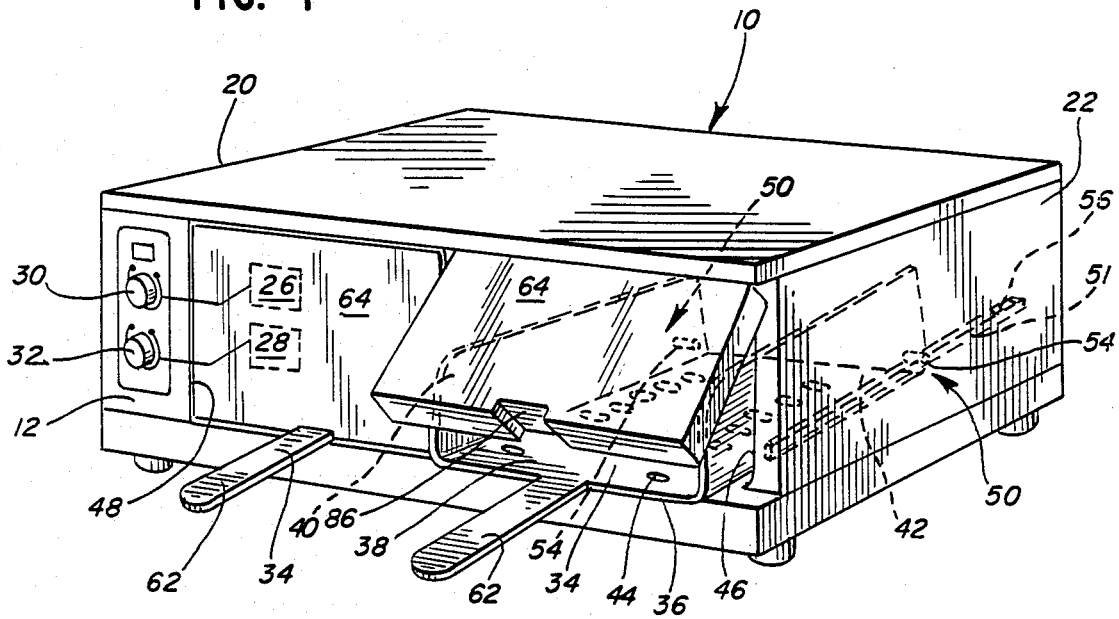
FIG. 1 is a perspective view of a two door/two tray cabinet according to the present invention.

According to the invention, a box-like cabinet 10 is provided for situation on a countertop or the like. The cabinet 10 has a front wall 12, rear wall 14, bottom wall 16, top wall 18 and spaced side walls 20, 22, cooperatively bounding a food treatment space 24. The walls 12, 14, 16, 18, 20, 22 preferably have an insulating core, of fiberglass, or the like, that is encased by stainless steel. Structures 26, 28, shown schematically in FIG. 1, are provided in the space 24 to control temperature and humidity therewithin. External knobs 30, 32 are provided to separately, manually control the structures 26, 28, respectively.

Figure 2:
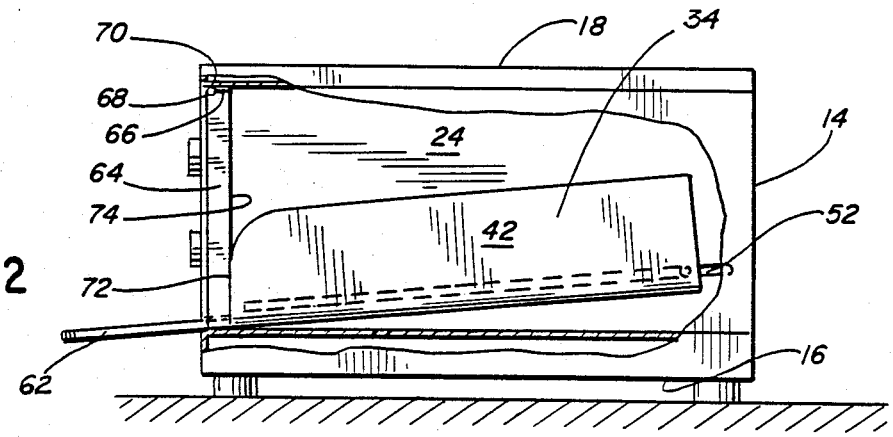
FIG. 2 is a side elevation view of the cabinet broken away to show one of the trays within the cabinet and its associated door in a closed position.
Figure 3:
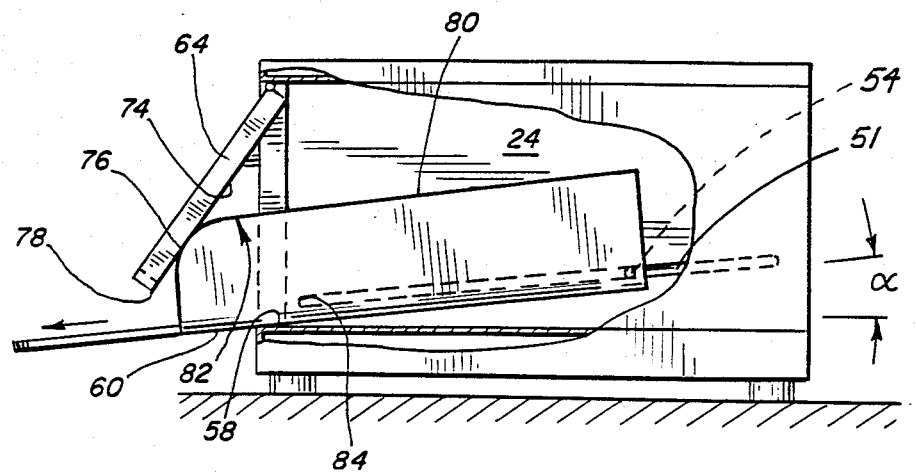
FIG. 3 is a view as in FIG. 2 with the tray partially withdrawn from the cabinet and its associated door partially open.

The structure shown in FIGS. 1–3 is intended for use as in restaurants to cook and/or preserve foods. For example, breads, pancakes, waffles and flour tortillas are frequently kept in such structures. Normally, the cabinet is loaded and unloaded by food servers and thus it is important that such structures be operable both conveniently and efficiently.

To facilitate placement of foods in the storage space 24 and removal of the foods therefrom, two like trays 34 are provided. It should be understood that the use of two trays is only exemplary and the use of one or more than two trays is clearly within the scope of the invention. For example, the use of four trays is convenient for relatively large operations serving tortillas and the like.

Each tray 34 has a flat bottom wall 36 defining an upwardly facing food support surface 38. Integrally formed with the bottom wall are laterally spaced, upturned side walls 40, 42, each making approximately a right angle with the bottom wall surface 38. The walls 36, 40, 42 cooperatively bound a space for the placement of food. The bottom wall 36 has a plurality of elongate openings 44 to permit passage of treated air upwardly through the contents of the tray 34.

The front wall 12 of the cabinet 10 has two laterally spaced, rectangular openings 46, 48 to permit passage therethrough of the trays 34 into and out of the food treatment space 24. Guided movement of the trays 34 in a fore and aft direction into and out of the space 24 is facilitated by a pin and slot connection at 50 on each side of the tray 34. The pin and slot connection 50 will be described herein between side wall 42 on the tray 34 and the cabinet side wall 22.

Each slot 51 is defined by a rail 52 having a generally laterally inwardly opening U-shape in cross section. One rail 52 is provided at each side of the tray. Pins 54 project oppositely from the side walls 40, 42 of the tray 34 and are each received in the slot 52 defined by each rail 52. A cutout 56 on the rail 52 facilitates entry of the pin 54 into the slot 51. The rails 52 are substantially straight and decline from the rear of the cabinet towards the front at an angle α. Each tray 34 is likewise supported in inclined orientation generally parallel to the rails 52 cooperatively by the pins 54 on the rails 52 and by the upwardly facing surface 58 on the bottom wall 16 of the cabinet 10. The surface 58 bears on the underside surface 60 of wall 36 which slides thereover as the tray is pushed into and withdrawn from the space 24. Inclination of the tray facilitates viewing of the contents thereof and loading and unloading of the food. The precise value of angle α depends on the type of food that is supported on the trays 34. Food, such as tortillas, covers a large area of the supporting surface and thus tends to adhere thereto so that only a a relatively large angle α is permitted. On the other hand, rolls and the like tend to roll and slide and thus only a small angle α for the rails 52 is permitted.

To facilitate sliding movement of the trays 34 into and out of the space 24, an elongate handle 62 is provided at the forward portion of the tray 34. Trays 34 are each shown to have the handle 62 integrally formed with the bottom tray wall 36. Thus, it is possible to form the entire tray from a single blank of sheet metal material.

At each opening 46, 48, and associated with each tray 34, is a hinged door 64. Each door 64 has a generally rectangular shape and is sufficiently large to completely cover its associated opening 46, 48. Each door 64 has a generally rectangular shape and is sufficiently large to completely cover its associated opening 46, 48. Each door 64 is hingedly connected to the top wall 18 of the cabinet 10 by a hinge 66 for pivoting about a horizontal axis 68. The hinge is arranged so that the hinge axis is adjacent to the top and front corner 70 of the door 64. With this connection, each door 64 will pivot under its own weight to the closed position, shown for the door 64 at the left side of the cabinet in FIG. 1.

According to the invention, each tray 34 cooperates with the door 64 so that upon the tray 34 being withdrawn, the door 64 is automatically opened and upon the tray 34 being pushed into the space 24, the door 64 automatically closes itself. To accomplish this, the front, free edge 72 of each side wall 40, 42 of the tray 34 is configured to squarely abut the rearwardly facing surface 74 of the door 64 with the door in the closed position in FIG. 2. Upon the tray 34 being withdrawn, the edges 72 bear against the door surface 74 and effect, in FIG. 2, clockwise pivoting of the door 74 about the pivot axis 68. With the door at approximately the FIG. 3 position, the door surface 74 encounters curved free edges 76 on the side walls 40, 42, which edges smoothly and progressively urge the door 64 in a clockwise pivoting direction until the bottom and rear corner 78 of the door 64 bears upon the straight, upwardly facing edges 80 of the side walls 40, 42. Upon the door corner 78 encountering the juncture at 82 between the curved edges 76 and upper edges 80 of the tray 34, no further pivoting of the door 64 occurs as the tray 34 is further withdrawn. In a fully withdrawn position, the pins 54 encounter a stop edge 84 associated with each rail 52 to thereby prevent inadvertent separation of the tray 34 from the cabinet 10. Upon the tray 34 being pushed back into the space 24, the door 64 closes under its own weight.

To accommodate the handle 62, each door 64 has a rectangular cutout 86 in which the handle 62 seats upon the door 64 being closed and the tray 34 being extended into the space 24. Through this arrangement, the handle 62 on each tray 34 remains at all times accessible forwardly of the door 64 while a close seal between the door 64 and cabinet 10 is established.

It can be seen that with one hand, a user of the device can grasp the handle 62 and withdraw the tray 34. The tray 34 automatically opens the door 64 so that the user is not required to ever directly manipulate the door 64. The user's other hand is thus free to load or unload food from the tray, after which the tray can be directed through the handle 62 into the space 24. The door 64 under its own weight than closes against the front wall 12 of the cabinet 10 to seal its associated opening 44, 46.

We claim:

1. A food treatment device comprising:
   a cabinet having a front and rear and defining a food treatment space and a front opening to permit access to said space;
   a door;
   means for mounting the door to the cabinet for movement between a closed position wherein the door covers the cabinet opening and an open position wherein access can be gained to said treatment space through said cabinet opening;
   a tray having a food support surface and laterally spaced flat side walls extending upwardly from said surface; and
   cooperating means on the tray and cabinet for mounting the tray for movement through said cabinet opening between a first position wherein the food support surface is substantially within the treatment space and a second position wherein the food support surface is at least partially outside of said treatment space to permit placement of food on and removal of food from the food support surface,
   said cooperating means comprising a pin on one of the tray and cabinet and a rail on the other of the tray and cabinet and defining a slot to receive the pin and guide movement of the tray between the first and second tray positions, said rail being inclined upwardly from front to rear with respect to said cabinet so that as the tray is moved from its first position to its second position facilitated access to the contents of the tray results, at least one of the tray side walls having an edge that bears directly against the door for moving the door from its closed position to its open position as an incident of movement of the tray from the first tray position to the second tray position and permits the door to move from its open position to its closed position as an incident of movement of the tray from the second tray position to the first tray position.

2. The food treatment device according to claim 1 wherein the door has a top and a bottom, the means for mounting the door comprises hinge means mounting the door for pivoting movement about a horizontal axis adjacent the top of the door so that the door moves under its own weight into its closed position.

3. The food treatment device according to claim 1 wherein means normally bias the door to its closed position.

4. The food treatment device according to claim 1 wherein each said side wall has said edge, and each said edge having a curved portion to progressively deflect the door upon the door being moved out of its first position towards it second position.

5. The food treatment device according to claim 1 wherein said tray has a substantially straight elongate handle to be grasped to facilitate movement of the tray by a user between its first and second positions.

6. The food treatment device according to claim 5 wherein said cabinet opening is at the front of the cabinet, the door has a top and bottom and the elongate handle extends underneath the door bottom and projects lengthwise forwardly of the cabinet with the door in its closed position to be grasped by a user, said door having an opening that closely conforms to said tray handle with the tray in its first position and the door in its closed position.

7. The food treatment device according to claim 1 wherein there are a plurality of doors and a like plurality of cooperating trays to individually selectively open and close the doors.

8. A food treatment device comprising:

a cabinet having a front and rear and defining a food treatment space and an opening at the front of the cabinet, said cabinet including spaced side walls;

means for selectively controlling environmental conditions within the food treatment space;

a door having a top and bottom;

means for hingedly attaching the door to the cabinet for pivoting movement about a horizontal axis above the bottom of the door between a closed position wherein the door covers the cabinet opening and an open position wherein access can be gained to the treatment space through the cabinet opening and for causing the door to be normally biased under its own weight into its closed position;

a tray having a food support surface and laterally spaced side walls extending upwardly from said surface;

cooperating means on the tray and cabinet side walls for mounting the tray for movement through said cabinet opening between a first position wherein the food support surface is substantially within the treatment space and a second position wherein the food support surface is at least partially outside of said treatment space to permit placement of food in and removal of food from the food support surface, said cooperating means comprising a pin on one of the tray and cabinet and a rail on the other of the tray and cabinet and defining a slot to receive the pin and guide movement of the tray between the first and second tray positions, said rail being arranged to cooperate with said pin to guide non-horizontal movement between said tray and cabinet as the tray is moved between its first and second positions to thereby facilitate access to the contents of the tray with the tray in its second position, at least one of the tray side walls having a cam edge for bearing against the door and moving the door from its closed position to its open position as an incident of movement of the tray from its first position to its second position; and elongate handle means projecting at all times forwardly of the door to be grapsed and for facilitating movement of the tray from its first position to its second position.

9. The food treatment device according to claim 8 wherein means are provided to limit forward travel of said tray to thereby prevent inadvertent separation of the tray from the cabinet.

10. The food treatment device according to claim 8 wherein said tray has a flat bottom wall defining said food support surface and said cam edge comprises a free edge on each of said side walls with a curved portion on each said edge, said side wall free edges simultaneously engaging the door and progressively opening the door from its vertical position wherein the door is closed as said curved portions move against the door.

11. The food treatment device according to claim 8 wherein there are a plurality of doors and a like plurality of cooperating trays to individually selectively open and close the doors.

* * * * *